US005562300A

United States Patent [19]

Nelson

[11] Patent Number: 5,562,300
[45] Date of Patent: Oct. 8, 1996

[54] JOGGING STROLLER

[76] Inventor: Richard L. Nelson, 7366 Capri Ct., Newburgh, Ind. 47630

[21] Appl. No.: 311,592

[22] Filed: Sep. 23, 1994

[51] Int. Cl.⁶ .................................................. B62B 7/06
[52] U.S. Cl. .................................. 280/655.1; 280/47.38; 280/62
[58] Field of Search ............................. 280/642, 647, 280/650, 655, 655.1, 658, 47.371, 47.38, 62; 301/111

[56] References Cited

U.S. PATENT DOCUMENTS

| | | | |
|---|---|---|---|
| 1,707,186 | 3/1929 | Chatfield | 280/658 |
| 4,042,274 | 8/1977 | Cabagnero | 280/650 |
| 4,542,916 | 9/1985 | Kassai | 280/642 |
| 4,570,956 | 2/1986 | Dyer | 280/47.38 |
| 4,953,880 | 9/1990 | Sudakoff et al. | 280/47.38 |
| 5,071,146 | 12/1991 | Lewis et al. . | |
| 5,076,599 | 12/1991 | Lockett et al. | 280/62 |
| 5,121,940 | 6/1992 | March . | |
| 5,123,670 | 6/1992 | Chen | 280/47.38 |
| 5,168,601 | 12/1992 | Liu | 280/47.371 |
| 5,188,389 | 2/1993 | Baechler et al. . | |
| 5,224,720 | 7/1993 | Chaw et al. . | |
| 5,265,931 | 11/1993 | Ryan . | |
| 5,299,825 | 4/1994 | Smith | 280/642 |
| 5,301,963 | 4/1994 | Chen . | |
| 5,314,241 | 5/1994 | Cheng | 301/111 |
| 5,344,171 | 9/1994 | Garforth-Bles | 280/62 |
| 5,364,119 | 11/1994 | Leu | 280/650 |

FOREIGN PATENT DOCUMENTS

| | | |
|---|---|---|
| 838795 | 6/1960 | United Kingdom ........ 280/655.1 |
| 2193692 | 2/1988 | United Kingdom . |
| 2204282 | 11/1988 | United Kingdom . |
| 2225557 | 6/1990 | United Kingdom . |
| 2254587 | 10/1992 | United Kingdom . |

*Primary Examiner*—Eric D. Culbreth
*Assistant Examiner*—Min Yu
*Attorney, Agent, or Firm*—Richard C. Litman

[57] ABSTRACT

A jogging stroller includes a tricycle wheeled frame adapted for the installation of an existing vehicle child safety seat therein. Most such seats include clips which are attachable to a metal rod structure, as found in the typical grocery shopping cart, and the present stroller includes such structure providing for the rigid clipping of such seats to the stroller frame. Alternatively, the seats may be strapped to the frame if desired. Preferably, the frame structure is formed of steel tubing for strength and durability. The wheels are relatively large, preferably being of fifteen inch diameter, in order to provide for ease of movement over uneven terrain, and are quickly and easily removable without need for tools in order to provide for compact storage. The handles are foldable over the remainder of the structure when the seat is removed, for further compact storage. The handle grips are forwardly angled, for optimum ergonomics for a person pushing the stroller. In at least one embodiment, the stroller is sufficiently wide to accommodate two child safety seats in a side by side array.

16 Claims, 8 Drawing Sheets

JOGGING STROLLER

FIELD OF THE INVENTION

The present invention relates Generally to strollers and wheeled carriages for infants and small children, and more specifically to a stroller adapted particularly to outdoor use and which enables a parent to jog or exercise while pushing the stroller. Different embodiments provide for the carriage of one or two removable infant seats from the frame of the stroller, and for the folding of the frame for compact storage thereof.

BACKGROUND OF THE INVENTION

Vigorous exercise is widely recognized as a healthful pursuit, and increasing numbers of people engage in such exercise by fast walking and/or jogging to reach or stay in good physical condition. Jogging and similar exercises have become increasingly popular, as such exercise develops the cardiovascular system and generally increases the health of the person so engaged, as well as allowing the jogger to experience fresh air and the outdoor environment.

New mothers are not exempt from the above benefits, and yet with the time constraints and pressures of parenthood, often find themselves unable to exercise regularly, even if they did so before the birth of their child or children. Infants and very small children should not be left unattended for any period of time, and it is difficult to take such children along while jogging or performing similar vigorous exercise. While strollers and carriages for infants and small children are well known, they are not generally suitable for use on jogging trails and other relatively uneven terrain.

Hence, many new mothers fall out of the habit of regular exercise, and may find their overall physical condition deteriorating at least slightly as a consequence. Accordingly, some strollers have been developed with larger wheels and other features which make them more suitable for use by a parent while he/she jogs or exercises. However, most of these devices are relatively bulky and difficult to transport, which is inconvenient to say the least if a drive to a suitable area must be made before jogging. The bulk and inconvenience of such a stroller may make its use sufficiently inconvenient to preclude more than very infrequent use, thus accomplishing nothing toward enabling the parent to exercise as desired.

Moreover, such devices can be relatively expensive, with their provision for an infant seat or the like as a standard feature. Considering that many jurisdictions require the use of a specialized infant seat in motor vehicles for children below a certain age, and the frequent need for the carriage of the stroller in the vehicle, the provision of a separate stroller seat and vehicle seat for the infant or small child is redundant, to say the least.

Accordingly, the need arises for a stroller for the carriage of infants or small children, which stroller includes various features providing for use on uneven terrain, such as relatively large diameter wheels, wheelbase, and track for stability. The stroller must be foldable for compact carriage and storage, with at least some of the wheels being easily removable therefrom without need for tools. Finally, the stroller should be available in two place form for the carriage of more than one child, if needed.

DESCRIPTION OF THE PRIOR ART

U.S. Pat. No. 5,071,146 issued to Joe Lewis et al. on Dec. 10. 1991 discloses a Convertible Infant Stroller adapted for partial folding of the two front legs and wheels for securing to an existing bicycle infant carrier. The Lewis et al. stroller includes an integral seat therein, which nests in the bicycle infant seat. While this provides some solution to the problem of the bulk of multiple seats for different uses, the retention of both the bicycle infant carrier seat and the stroller seat is redundant.

U.S. Pat. No. 5,121,940 issued to Janet L. March on Jun. 16, 1992 discloses a Collapsible Infant Seat Carrier comprising an eight wheeled frame into which an infant carrier may be strapped. The attachment of the infant carrier to the stroller is not rigid, as in one of the embodiments of the present invention, and the numerous relatively small wheels are unsuitable for use on uneven terrain, unlike the three larger diameter wheels of the present stroller.

U.S. Pat. No. 5,188,389 issued to Philip A. Baechler et al. on Feb. 23, 1993 discloses a Foldable Baby Stroller And Axle Assembly Therefor comprising a three wheeled frame having a plurality of hub sections with frame members attached thereto. The hub sections revolve about the axle to allow the frame members to pivot about the axle for folding. No disclosure is made of the removal of the wheels for additional folding, nor of any means for the attachment of one or more infant seats within the frame, both of which features are provided for by the present invention.

U.S. Pat. No. 5,224,720 issued to Natural Chaw et al. on Jul. 6, 1993 discloses a Stroller For A Baby generally comprising a plurality of structural members attached to an infant seat. The front frame member carrying the front wheel, the rear axle carrying the two rear wheels, a push handle, a sun shade, and a foot rest are all attached to the seat. Thus, the seat forms an integral part of the structure, unlike the separate frame of the present stroller. The Chaw et al. stroller requires a relatively large amount of effort to disassemble the structure from the seat, so the seat may be used in another environment, and the radial retaining pins for the main wheel axle shafts result in still further additional parts and complexity.

U.S. Pat. No. 5,265,931 issued to Stephen E. Ryan on Nov. 30, 1993 discloses a Detachable Child Seat And Supporting Frame comprising a seat and frame combination which may be installed in a variety of different wheeled conveyances, including strollers. The various conveyances are all specially adapted for the special seat and frame, rather than being adapted for an existing seat which may be used without a supporting frame as a vehicle child safety seat. The seat frame is strapped to the conveyance, rather than rigidly attached thereto.

U.S. Pat. No. 5,301,963 issued to Chen-Yuan Chen on Apr. 12, 1994 discloses a Convertible Stroller in which the single front wheel may be folded for storage, or alternatively removed (with its accompanying frame components) to allow use of the device as a two wheeled bicycle cart or the like. The seat is a canvas type sling, and does not have sufficient rigidity to allow use as a vehicle infant seat. The seat is secured to the frame using flexible attachment means (i.e., hook and loop fasteners).

British Patent No. 2,193,692 to David A. Burgoyne and published on Feb. 17, 1988 discloses a Single/Double Seated Pushchair which is laterally expandable by means of extendible telescoping crossmembers. The stroller frame utilizes a total of eight relatively small wheels, unlike the tricycle arrangement of the present stroller. No quick release means for disconnecting at least some of the wheels, is disclosed by Burgoyne.

British Patent No. 2,204,282 to Murray E. Pevan et al. and published on Nov. 9, 1988 discloses a Folding Infant Carriage using a "push chair type seat . . . of generally conventional design . . . " rather than a vehicle safety seat for infants and small children, as provided for by the present invention. The Pevan et al. carriage uses at least four permanently installed wheels, unlike the present tricycle stroller with removable wheels.

British Patent No. 2,225,557 to Shih-Lin Mar and published on Jun. 6, 1990 discloses a Multi-Purpose Stroller With Detachable Frame, comprising an eight wheeled stroller frame and a specially constructed seat securable thereto. The seat is specially formed to attach to the stroller frame, rather than being an existing seat with the frame adapted to use such, as in the present stroller.

Finally, British Patent No. 2,254,587 to Graham Church and published on Oct. 14, 1992 discloses a Child Seat Convertible Into Pushchair, again utilizing a specially constructed infant seat and frame therefor. The frame includes at least four relatively small wheels, unlike the present tricycle configuration, with the seat being mounted relatively high in the frame.

None of the above noted patents, taken either singly or in combination, are seen to disclose the specific arrangement of concepts disclosed by the present invention.

SUMMARY OF THE INVENTION

By the present invention, an improved jogging stroller is disclosed.

Accordingly, one of the objects of the present invention is to provide an improved jogging stroller which comprises a tricycle frame configuration adapted for the installation of at least one existing vehicle child safety seat thereon.

Another of the objects of the present invention is to provide an improved jogging stroller which includes relatively large wheels preferably having a diameter of at least twelve inches up to fifteen inches or more, in order to provide for ease of travel over uneven and rough terrain.

Yet another of the objects of the present invention is to provide an improved jogging stroller in which at least some of the wheels are quickly and easily removable and installable without need for tools, using quick release pins and fasteners.

Still another of the objects of the present invention is to provide an improved jogging stroller in which at least the handle portion is foldable over the balance of the structure when the rigid child safety seat is removed therefrom.

A further object of the present invention is to provide an improved jogging stroller which includes handles or hand grips which are forwardly inclined in order to reduce wrist stress for the person pushing the stroller.

An additional object of the present invention is to provide an improved jogging stroller which is adapted for the rigid attachment of one or more vehicle child safety seats, which seats are equipped with clip means providing for the securing of such seats to the rod members of a grocery shopping cart or the like.

Another object of the present invention is to provide an improved jogging stroller which may be used in combination with vehicle child safety seats secured thereto with straps or the like.

Yet another object of the present invention is to provide an improved jogging stroller which frame is constructed of steel tubing for durability and strength.

Still another object of the present invention is to provide an improved jogging stroller which in at least one embodiment provides for the attachment of two vehicle child safety seats thereto, with the seats in a side by side array.

A final object of the present invention is to provide an improved jogging stroller for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the figures of the attached drawings.

DETAILED DESCRIPTION OF THE PREFERRED EMBODIMENTS

Figure 1:
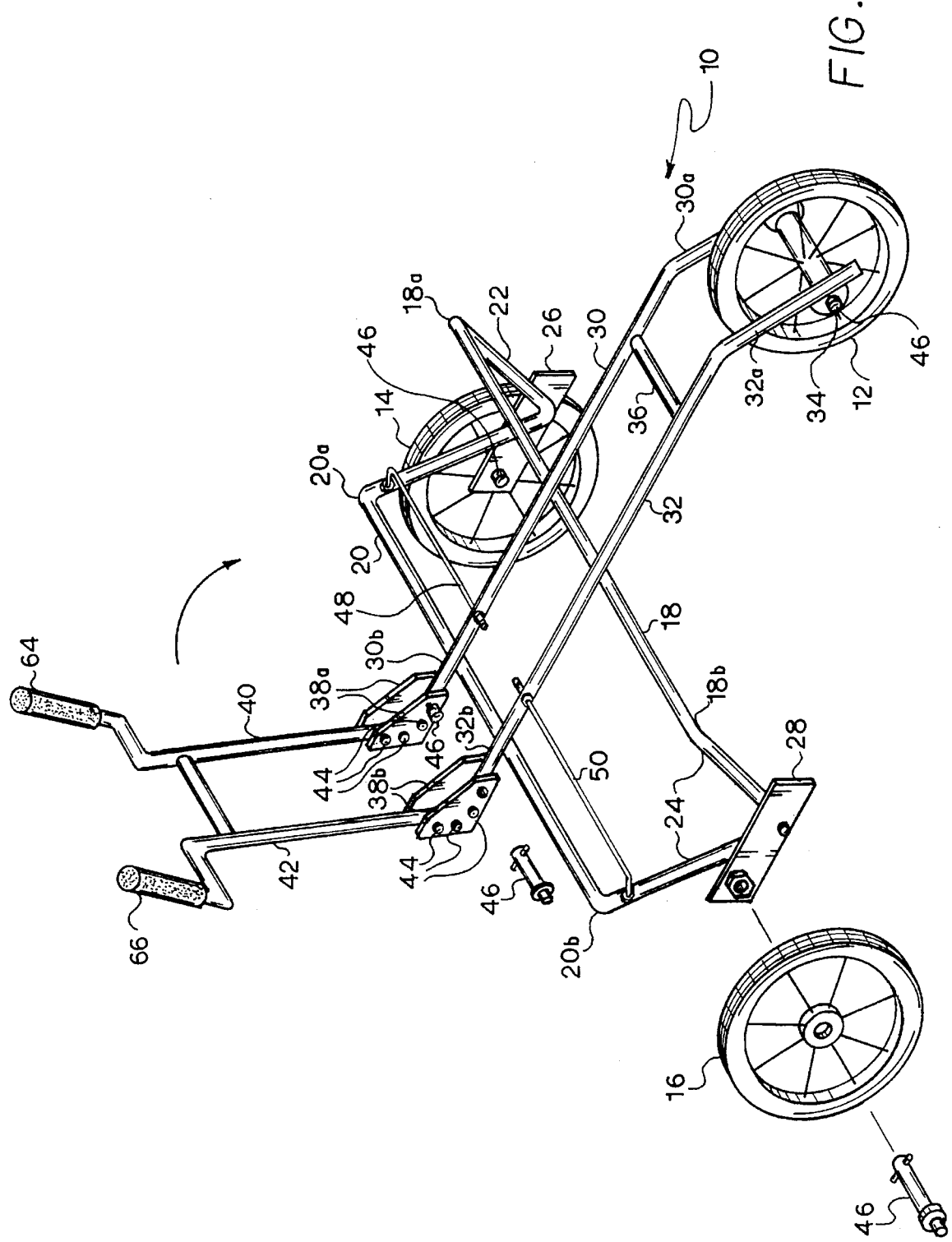
FIG. 1 is an exploded perspective view of a first embodiment of the present stroller, showing its general configuration adapted for the removable installation and carriage of two vehicle child safety seats in a side by side array, and the wheel removal and handle folding means.
Figure 6:
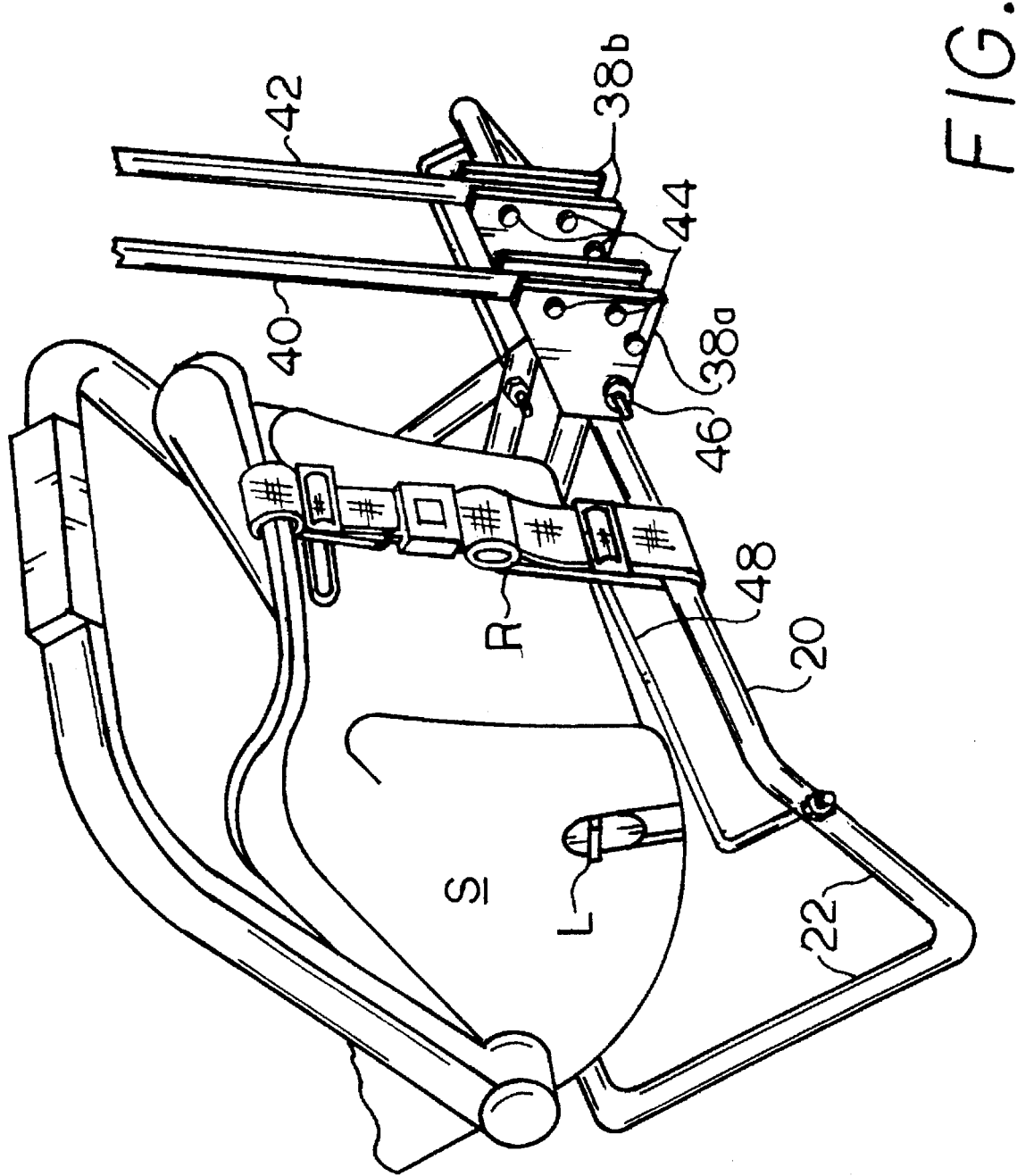
FIG. 6 is a partial rear perspective view showing further attachment of the safety seat to the stroller frame using a strap.
Figure 7:
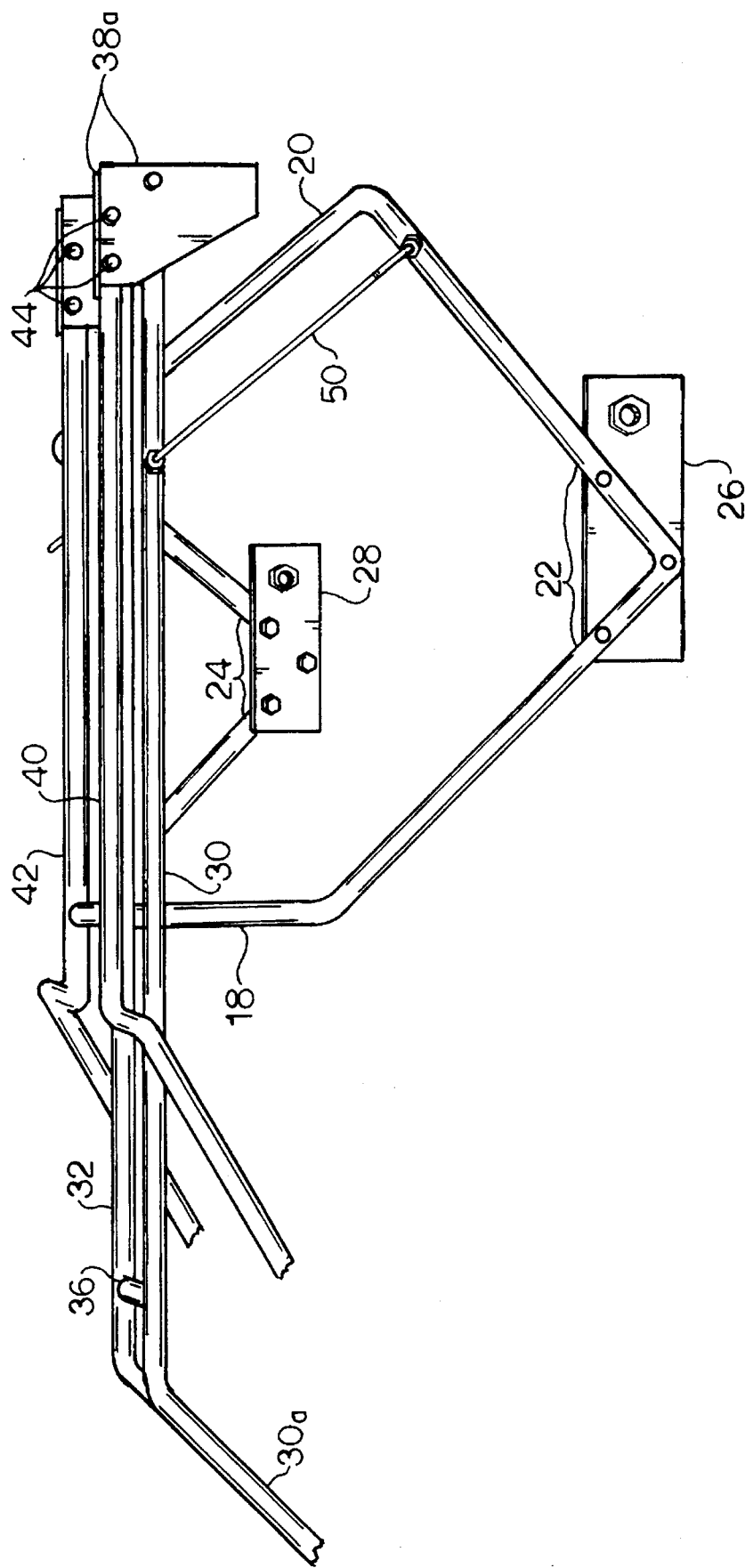
FIG. 7 is a left side view of the stroller frame, showing the main wheels removed and the handles in their forwardly folded position for storage.
Figure 8:
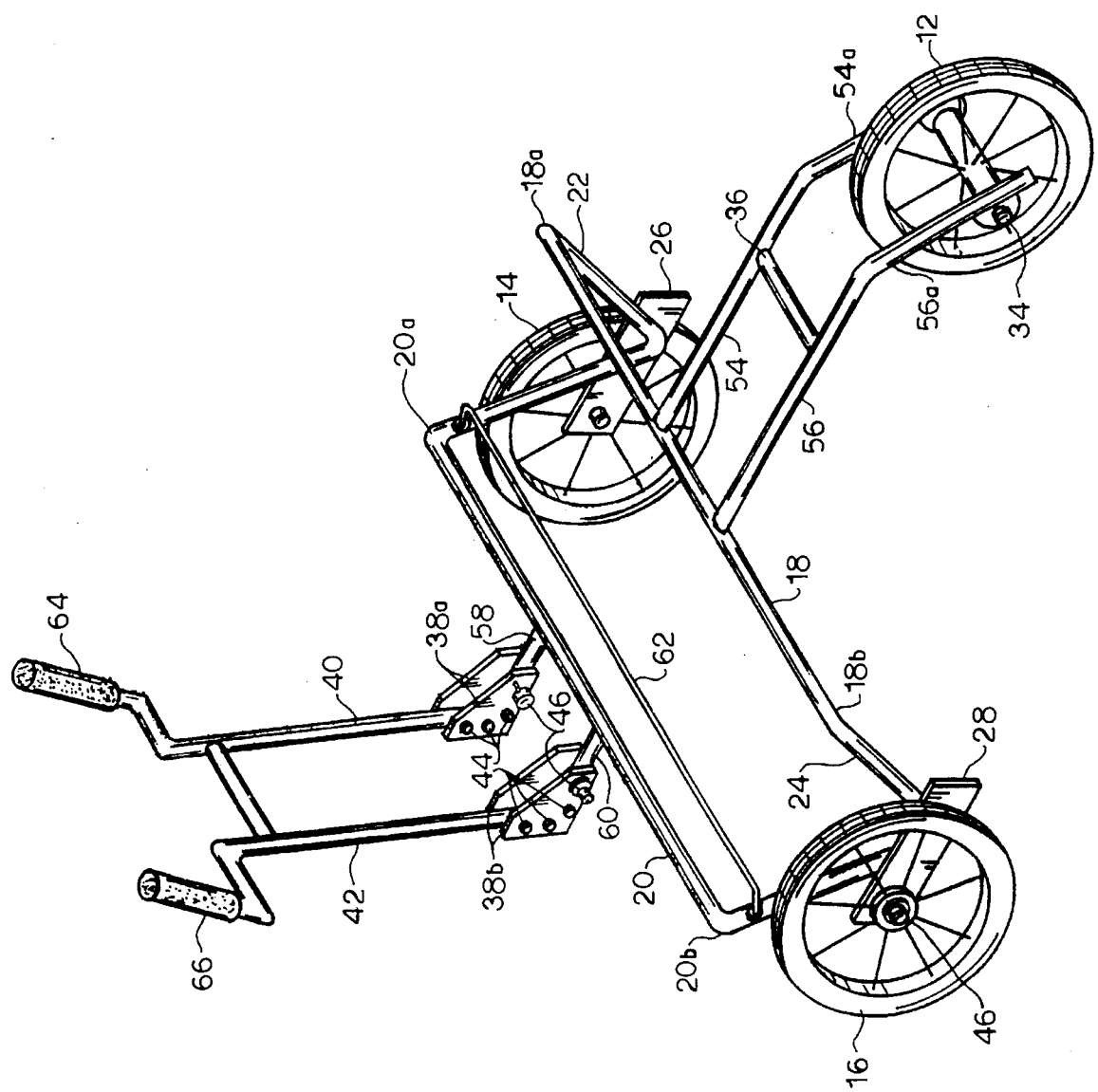
FIG. 8 is a second embodiment of the present stroller, providing for the removable installation thereon of a single child safety seat.

Referring now particularly to FIG. 1 of the drawings, the present invention will be seen to relate to a jogging stroller 10 having a single front wheel 12 and rearwardly disposed left and right main wheels 14 and 16 to provide a tricycle configuration. In each of the embodiments of the present invention, the stroller is configured to carry at least one vehicle child safety seat. In the embodiment of FIGS. 1 through 7, two such seats may be carried in a side by side array. FIG. 8 discloses a alternative embodiment providing for the carriage of a single safety seat.

In each of the embodiments, the frame includes a first or forward lateral member 18 and a second or rearward lateral member 20 parallel thereto. Each of the lateral members 18 and 20 respectively includes a left end 18a/20a and a right end 18b/20b, from which respective left and right V-shaped members 22 and 24 depend. The two V-shaped members 22 and 24 each include means providing for the attachment of the main wheels 14 and 16 thereto at the apices of the V, such as the left and right wheel attachment plates 26 and 28 affixed to the V members 22 and 24.

In the embodiment of FIGS. 1 through 7, parallel left and right longitudinal members 30 and 32 extend across the two lateral members 18 and 20 at right angles thereto and are permanently affixed thereto (e. g., bolts, welding, etc.). The two longitudinal members 30 and 32 include an axle 34 for the front wheel 12 disposed therebetween at the forward ends thereof, with the front ends 30a and 32a being angled downwardly, preferably at a 45 degree downward angle from the main portions of the longitudinal members 30 and 32. The downwardly angled ends 30a and 32a serve to place the front axle 34 at substantially the same distance below the main portions of the longitudinal members 30 and 32 as the main wheel axles, thus ensuring that the frame is level when the stroller is on a level surface. (The front wheel 12 and/or the main wheels 14 and 16 may be made to be easily removable by means of easily removable axles, as will be discussed further below.) The two longitudinal members 30 and 32 may include one or more crossmembers 36 extending therebetween for greater strength and rigidity, with the two lateral members 18 and 20 also acting as crossmembers for the left and right longitudinal members 30 and 32.

The rearward ends 30b and 32b of the two longitudinal members 30 and 32 each include handle attachment means extending therefrom. The handle attachment means may comprise a left pair 38a and a right pair 38b of plates, with each longitudinal member rearward end portion 30b/32b being sandwiched between two of the plates comprising a pair 38a/38b. Each pair of plates 38a/38b respectively includes a left and a right handle bar 40 and 42 extending outwardly therefrom and affixed thereto by means of at least two bolts 44; alternatively, welding or other means of immovably affixing the plate pairs to their respective handles, may be used. Another single bolt 44 serves to pivotally secure the plates 38a/38b respectively to the rearward ends 30b/32b of the two longitudinal frame members 30/32. However, rather than using additional fixed bolts to secure the plates immovably to the longitudinal members and thereby fix the handlebars 40 and 42 in a permanently extended position, quick release pins 46 (e.g., pins with radially retractable retainers actuated by axial buttons at one end of the pins) are used. By removing the quick release pins 46, the plates 38a/38b are allowed to pivot forwardly about the single bolts 44 in the extreme ends 30b/32b of the two longitudinal members 30/32, thereby allowing the handlebars to be folded forward over the remainder of the frame components, as shown in FIG. 7.

Similar pins 46 may be used as axles to secure the three wheels 12, 14, and 16 in their respective positions, as shown in FIG. 1 with the right main wheel 16; such pins are adaptable to any or all of the wheels. By removing the various pins 46, the wheels 12, 14 and 16 may be removed from the stroller frame to provide for more compact storage, e.g., in the trunk or back seat of a car for transport, if desired.

As noted above, there may be times when the present stroller 10 (and a child safety seat which may be secured thereto) may be in storage or otherwise not in use. In many jurisdictions, use of a child safety seat is required for infants or small children riding in a passenger vehicle, and the present stroller 10 provides for the removable attachment of such a seat to the stroller frame, when the seat is not needed in a vehicle. Thus, the redundancy of having two child seats for different purposes is obviated by the present invention. Most such seats, such as the seat S of FIGS. 2 through 6, include means for securing the seat S to an existing wire basket type shopping cart, to increase the versatility of the seat S. Thus, the seat S may be removed from the vehicle and secured to the cart, by means of one of the lateral rod or wire members of the cart, while the parent or guardian is shopping.

Figure 4:
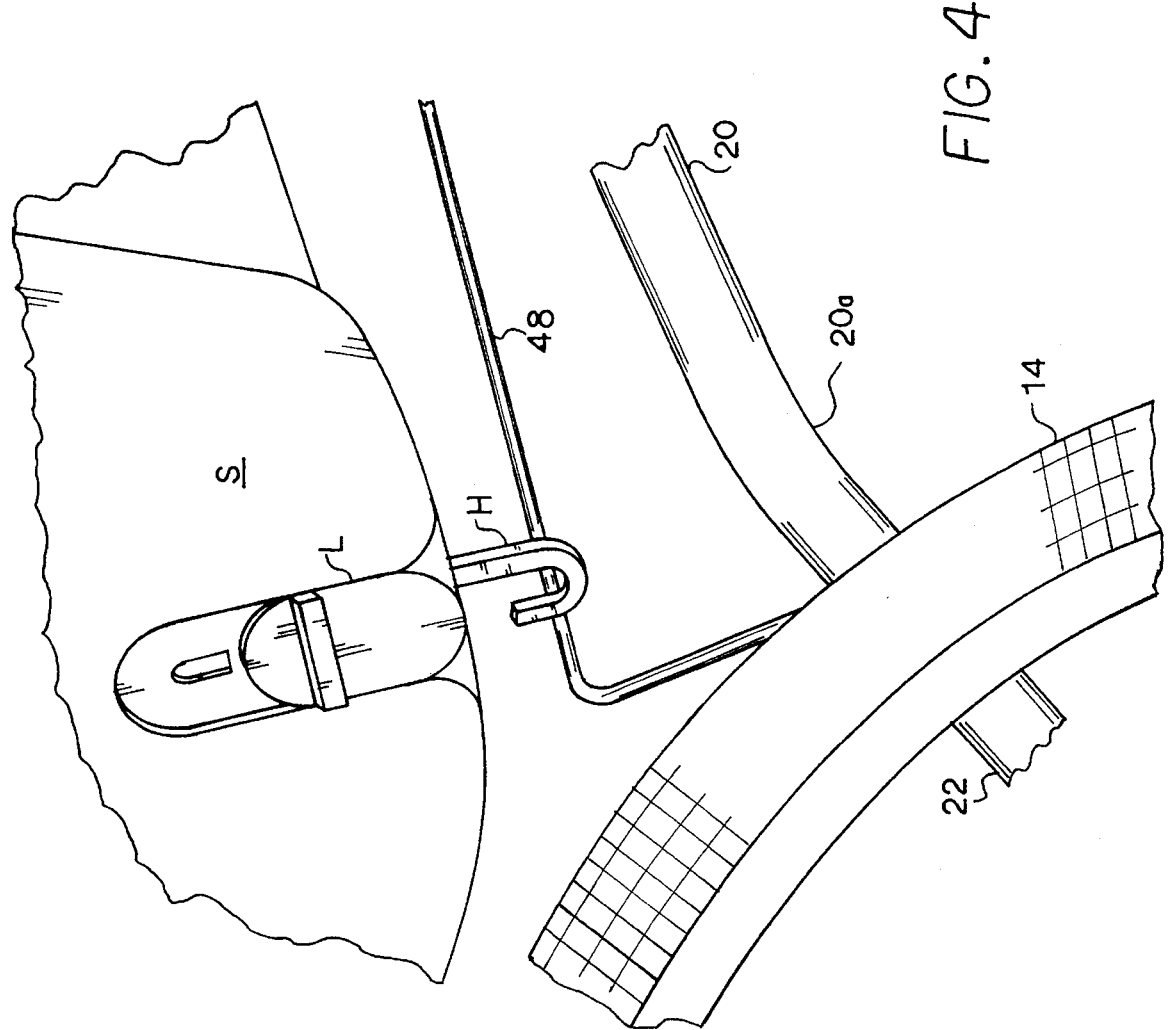
FIG. 4 is a detail perspective view showing the conventional latching means used in many child safety seats for use with shopping carts and the like, and the means provided with the present stroller to adapt such latching means to the stroller.
Figure 5:
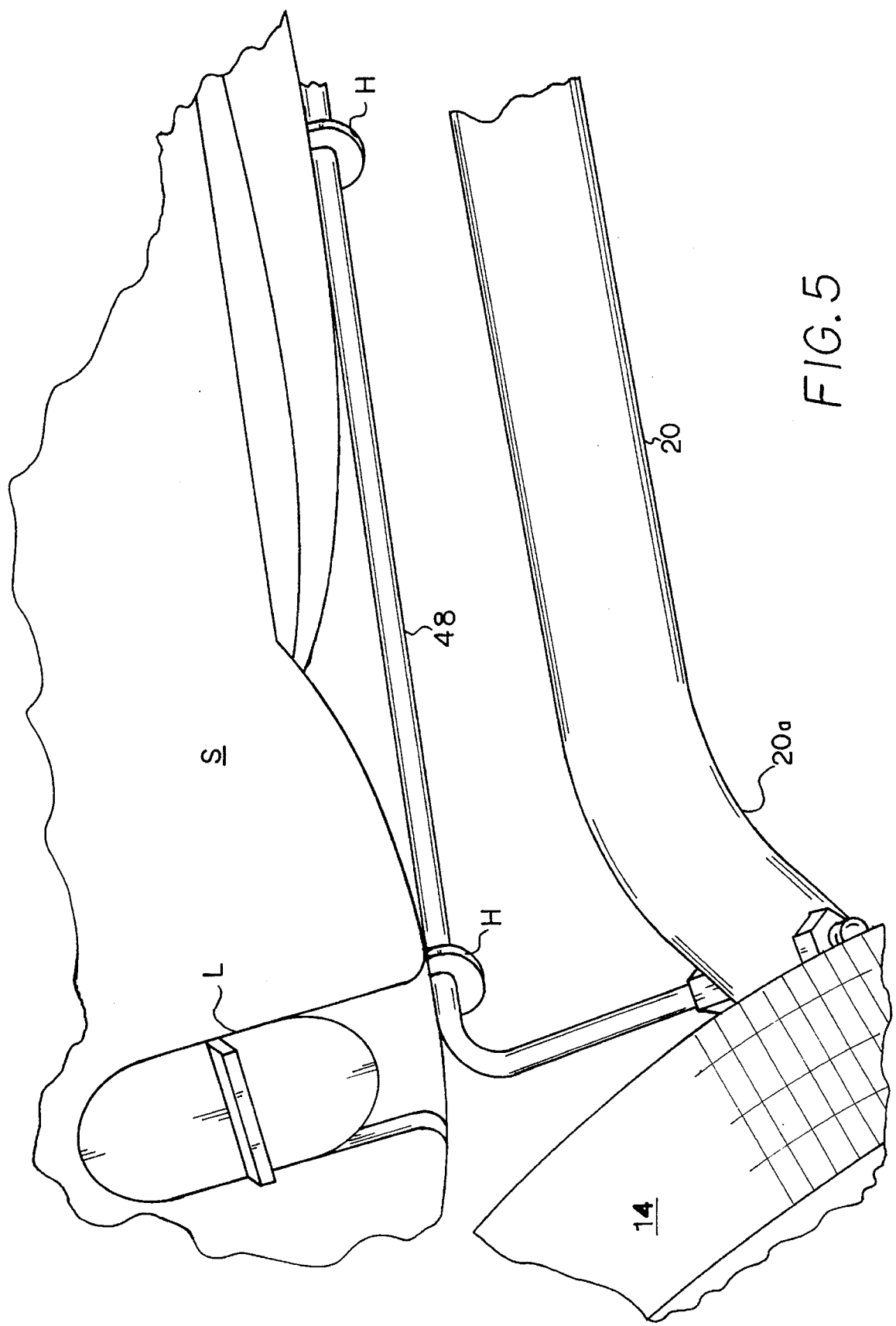
FIG. 5 is a detail perspective view of the latching means of FIG. 4 secured to the stroller.

Accordingly, the present stroller includes left and right lateral seat latch attachment rods 48 and 50 (in the two seat embodiment of FIGS. 1 through 7), to which the existing seat security means may be latched. Typically, such seats S include left and right lateral latch hooks H at each side and near the seat bottom, which open downwardly by means of a slide lever L; this detail is best shown in FIGS. 4 and 5. In FIG. 4, the slide lever L is depressed downwardly, which also extends the latch hook H to allow it to grasp the lateral seat attachment rod 48/50. In FIG. 5, the slide lever L has been moved upward to its secure position, whereupon the latch hook H is secured about the rod 48/50 to secure the seat S immovably thereto, and to the remainder of the stroller 10. As the primary attachment means is by the rigid latch hooks H, the seat S is unable to shift or otherwise move relative to the stroller frame, as might be the case with straps or belts.

Figure 2:
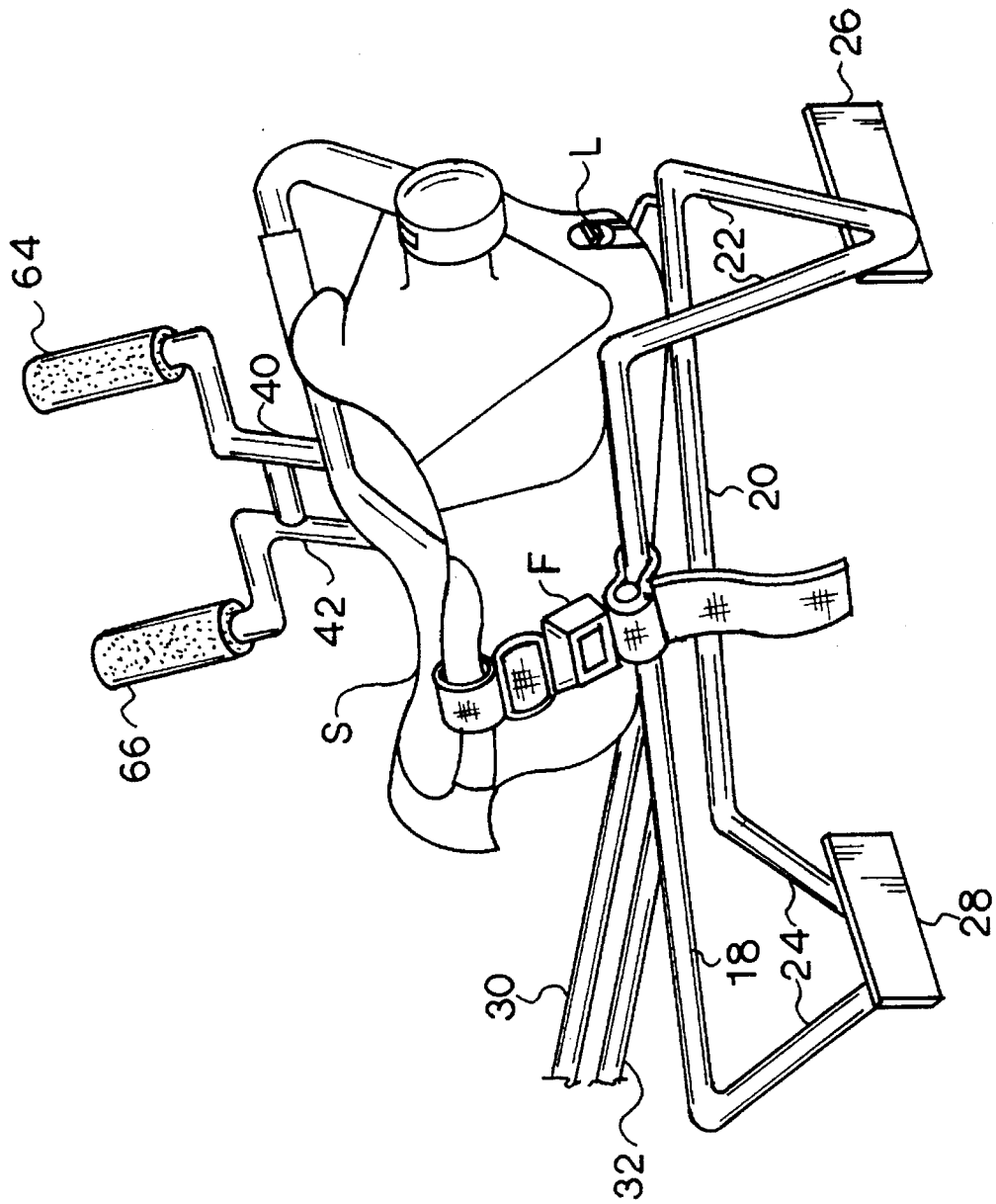
FIG. 2 is a partial front perspective view of the stroller framer showing the front attachment means for the child safety seat.
Figure 3:
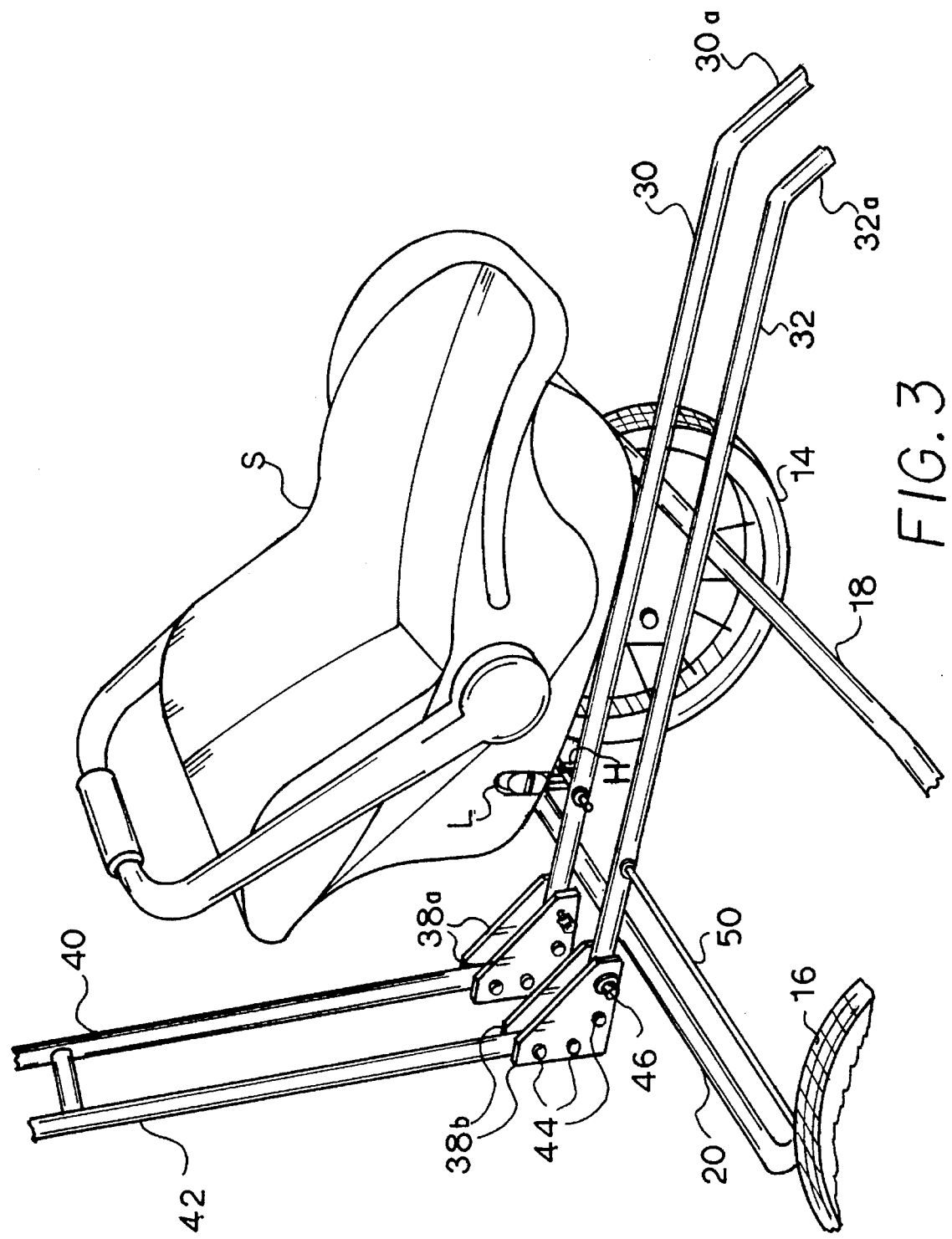
FIG. 3 is a partial right side perspective view of the stroller frame, showing further seat installation details.

Alternatively, straps and/or buckles may be used in lieu of or in addition to the above described latch means for such seats S, in the event that additional security is required or the seats used are not equipped with such latch means. FIGS. 2 and 6 respectively show the use of a forward belt or strap and buckle system F, and an equivalent rear belt or strap and buckle system R, to secure the seat S to the stroller 10 frame. As such straps and buckles are normally used to secure such seats S within a passenger vehicle, they may also be used to secure the seat S to the present stroller frame. However, it will be understood that such straps and belts, due to their flexible nature, will allow some movement or displacement of the seat S relative to the stroller frame. The rigid latch means discussed further above precludes such movement.

FIG. 8 discloses an alternative embodiment, providing for the carriage of a single child safety seat S therein. Many of the components of the stroller 52 of FIG. 8 will be seen to be identical to those of the stroller 10 of FIGS. 1 through 7, i.e., the wheels 12, 14, and 16; the subassembly comprising the lateral members 18 and 20, V-shaped members 22 and 24, and the wheel attachment plates 26 and 28; the handle attachment plates 38a and 38b, and their associated attachment components 44 and 46; and the two handlebars 40 and 42. However, as the stroller 52 frame is intended to carry only a single seat S, the longitudinal members may be made lighter by eliminating the central portions thereof and welding or otherwise securing them directly to the first and second lateral members 18 and 20. Accordingly, the stroller 52 includes left and right forward longitudinal members 54 and 56, and left and right rearward longitudinal members 58 and 60, respectively extending from the forward and rearward lateral members 18 and 20.

The forward longitudinal members 54 and 56 of FIG. 8 will be seen to be similar to the equivalent portions of the longitudinal members 30 and 32 of FIGS. 1 through 7, forward of the first lateral member 18. Forward longitudinal members 54 and 56 each respectively include a forwardly and downwardly inclined front end portion 54a and 56a, serving to place the front wheel axle 34 (or quick release pin 46, if used) at the same level as that of the main wheel when the frame is level. The rearward longitudinal members 58 and 60 serve to secure the handle means, comprising handlebars 40 and 42 and other components, to the rest of the structure by means of the handle attachment plate pairs 38a and 38b, in the manner of the embodiment of FIGS. 1 through 7. As the longitudinal members do not extend continuously from front to rear in the embodiment of FIG. 8, the seat attachment rod 62 may extend continuously laterally across the frame, immediately in front of the second or rear lateral member 20.

The present stroller embodiments 10 and 52 provide for ease of conveyance of an infant or small child while the parent or guardian engages in vigorous exercise, e. g., fast walking, jogging, etc. The relatively large wheels, preferably at least twelve inches and more preferably fifteen inches in diameter, along with the tricycle configuration, provide for ease of movement and stability over uneven terrain, such as footpaths, jogging trails, uneven pavement, etc. The handle means also provides for further ease of use, by means of the forwardly angled handle grip portions 64 and 66 respectively outwardly offset and extending upwardly and forwardly from the two handlebars 40 and 42. By angling the two grips 64 and 66 forward some seven degrees from the vertical with the handle extended, optimum wrist positioning is obtained to relieve stress.

The provision for wheel removal by means of the quick release pins 46, and the folding handle means and removable seat S, provide for an extremely compact structure for storage and/or carriage by family car or the like to an appropriate area for use. As the present stroller 10/52 is required due to one or more infants or small children accompanying the adult jogger or exerciser, those small children will each have their own vehicle child safety seat S secured in the vehicle during the trip, thus obviating any need for separate seats permanently installed in the stroller 10/52, and further providing for compact folding of the present stroller 10/52.

When the destination is reached, the adult may remove the stroller 10/52 from the vehicle, attach the wheels 12/14/16, and extend and lock the handlebars 40/42 by means of the quick release pins 46. The safety seat(s) may then be removed from the car and installed in the stroller 10 (if two children are present) or 52 (accommodating a single seat), with the seat bottoms nesting between the first and second lateral members 18 and 20. The seat latch hooks H (if any) may be rigidly secured to the seat attach rod(s) 48 and 50 (for stroller 10) or 62 (for stroller 52), and/or secured to the stroller frame by means of belts or straps such as the forward and rearward belt and strap F and R of FIGS. 2 and 6. The above procedure is just as easily reversed when use of the stroller 10/52 is no longer needed, with the seat(s) S being reinstalled in the vehicle for the return trip.

It is to be understood that the present invention is not limited to the sole embodiments described above, but encompasses any and all embodiments within the scope of the following claims.

I claim:

1. A stroller providing for the removable installation of at least one existing vehicle child safety seat therein and the carriage of at least one child therein, comprising:

a stroller frame having a forward end and a rearward end, said frame including left and right longitudinal members extending from said forward end of said frame to said rearward end of said frame;

a first lateral member affixed across said longitudinal members;

a single front wheel at said forward end;

a left and a right main wheel at said rearward end, each main wheel attached to said first lateral member to provide a tricycle configuration;

handle means disposed at said rearward end of said frame, and;

a first seat attachment rod and a second seat attachment rod, each extending laterally outward from one of said longitudinal members to said first lateral member, said first and said second attachment rods providing for the removable installation of at least one existing vehicle child safety seat to said frame, whereby;

at least one existing vehicle child safety seat is removably installed to said seat attachment rod by latch hooks and said stroller provides for the conveyance of at least one child within the child safety seat secured to said stroller frame.

2. The stroller of claim 1 wherein:

said stroller is adapted for use over uneven terrain, with said wheels each having a diameter of at least twelve inches.

3. The stroller of claim 1 including:

a single axial quick release pin disposed at each said wheel, with each said pin comprising means providing for the removable attachment of each said wheel to said stroller by hand.

4. The stroller of claim. 1 wherein:

said handle means is forwardly foldable and is secured to said rearward end of said stroller frame by a plurality of transverse fasteners, with at least one of said transverse fasteners comprising a quick release pin, whereby;

said quick release pin is removed and said handle means is pivotally folded forward about another of said transverse fasteners.

5. The stroller of claim 1 wherein:

said handle means includes, handlebars having a proximal end and a distal end, handle attachment means for pivotally attaching said handlebars to said stroller frame, said attachment means securing said handle bars in a substantially vertical deployed position and allowing said handlebars to fold forward over said stroller frame into a compact storage position, and two handle grips extending from said distal end of said handlebars, said handle grips being angled forwardly from vertical when said handlebars are in the substantially vertical deployed position, whereby;

proper ergonomic comfort is provided for a person pushing said stroller and undue wrist strain is precluded.

6. The stroller of claim 1 wherein:

said left and right longitudinal members have front ends angled downwardly at substantially a 45 degree angle, with a single front wheel installed between said downwardly angled front ends of said left and right longitudinal members.

7. The stroller of claim 1 wherein:

said frame includes means providing for the removable installation of two existing vehicle child safety seats to said frame, with the seats disposed laterally in a side by side array.

8. The stroller of claim 1 wherein:

said frame is formed of tubular steel and includes means for removably attaching said front wheel and means for foldably attaching said handle means to said frame;

a second lateral member affixed across said longitudinal members, each said lateral member affixed across said longitudinal members at right angles thereto, with said first lateral member affixed to said longitudinal members adjacent said rearward end, each lateral member including opposite ends;

V-shaped members depending from each of said opposite ends of said lateral members, each V-shaped member including means for the removable attachment respectively of each said main wheel.

9. In combination with a vehicle child safety seat adapted for removable installation in a motor vehicle and providing for the safe conveyance of a child therein, a stroller providing for the removable installation of at least one vehicle child safety seat therein and the carriage of at least one child therein, comprising:

a stroller frame having a forward end and a rearward end, said frame including left and right longitudinal members extending from said forward end of said frame to said rearward end of said frame;

a first lateral member affixed across said longitudinal members;

a single front wheel at said forward end;

a left and a right main wheel at said rearward end, each main wheel attached to said first lateral member to provide a tricycle configuration;

handle means disposed at said rearward end of said frame;

at least one vehicle child safety seat including latch hooks depending downwardly therefrom; and a first seat attachment rod and a second seat attachment rod, each extending laterally outward from one of said longitudinal members to said first lateral member, said first and second attachment rod providing for the removable installation of at said least one existing vehicle child safety seat through cooperation with said latch hooks, whereby;

said at least one vehicle child safety seat is removably installed to said stroller frame and said stroller provides for the conveyance of at least one child within said child safety seat secured to said stroller frame.

10. The stroller and child safety seat combination of claim 9 wherein:

said stroller is adapted for use over uneven terrain, with said wheels each having a diameter of at least twelve inches.

11. The stroller and child safety seat combination of claim 9 including:

a single axial quick release pin disposed at each said wheel, with each said pin comprising means providing for the removable attachment of each said wheel to said stroller by hand.

12. The stroller and child safety seat combination of claim 9 wherein:

said handle means is forwardly foldable and is secured to said rearward end of said stroller frame by a plurality of transverse fasteners, with at least one of said transverse fasteners comprising a quick release pin, whereby;

said quick release pin is removed and said handle means is pivotally folded forward about another of said transverse fasteners.

13. The stroller and child safety seat combination of claim 9 wherein:

said handle means includes,
 handlebars having a proximal end and a distal end,
 handle attachment means for pivotally attaching said handlebars to said stroller frame, said attachment means securing said handle bars in a substantially vertical deployed position and allowing said handlebars to fold forward over said stroller frame into a compact storage position, and
two handle grips extending from said distal end of said handlebars, said handle grips being angled forwardly from vertical when said handlebars are in the substantially vertical deployed position, whereby;

proper ergonomic comfort is provided for a person pushing said stroller and undue wrist strain is precluded.

14. The stroller and child safety seat combination of claim 9 wherein:

said left and right longitudinal members have front ends angled downwardly at substantially a 45 degree angle, with a single front wheel installed between said downwardly angled front ends of said left and right longitudinal members.

15. The stroller and child safety seat combination of claim 9 wherein:

said frame includes means providing for the removable installation of two said vehicle child safety seats to said frame, with said seats disposed laterally in a side by side array.

16. The stroller and child safety seat combination of claim 9 wherein:

said frame is formed of tubular steel and includes means for removably attaching said front wheel and means for foldably attaching said handle means to said frame;

a second lateral member affixed across said longitudinal members, each said lateral member affixed across said longitudinal members at right angles thereto, with said first lateral member affixed to said longitudinal members adjacent said rearward end, each lateral member including opposite ends;

V-shaped members depending from each of said opposite ends of said lateral members, each V-shaped member including means for the removable attachment respectively of each said main wheel.

* * * * *